United States Patent
Gallenbacher et al.

(10) Patent No.: US 11,379,543 B2
(45) Date of Patent: Jul. 5, 2022

(54) METHOD AND SYSTEM FOR DYNAMIC DISPLAY OF PERSONALIZED IMAGES

(71) Applicant: Mastercard International Incorporated, Purchase, NY (US)

(72) Inventors: Heinz Ramin Gallenbacher, Vienna (AT); David Lim, New York, NY (US); Vasily Giria, Secaucus, NJ (US); Nili Klenoff, Rye Brook, NJ (US); Sachin Ahuja, Millstone Township, NJ (US); Grant Gortsema, Ossining, NJ (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 113 days.

(21) Appl. No.: 15/614,849

(22) Filed: Jun. 6, 2017

(65) Prior Publication Data

US 2017/0351771 A1 Dec. 7, 2017

Related U.S. Application Data

(60) Provisional application No. 62/346,126, filed on Jun. 6, 2016.

(51) Int. Cl.
*G06F 16/9535* (2019.01)
*G06F 16/95* (2019.01)
(Continued)

(52) U.S. Cl.
CPC .......... *G06F 16/9535* (2019.01); *G06F 16/95* (2019.01); *G06Q 20/363* (2013.01); *G06F 16/9577* (2019.01)

(58) Field of Classification Search
CPC ................ G06F 16/95; G06F 16/9535; G06F 17/30867; G06F 17/30; G06F 16/9577; G06Q 20/363
See application file for complete search history.

(56) References Cited

U.S. PATENT DOCUMENTS 8,930,805 B2 * 1/2015 Andersen ................ G06F 21/52
715/234
9,262,771 B1 * 2/2016 Patel .................... G06Q 20/325
(Continued)

FOREIGN PATENT DOCUMENTS

DE    10 2013 012 409 A1    1/2015

OTHER PUBLICATIONS

Notification of Transmittal of the International Search Report (Forms PCT/ISA/220 and PCT/ISA/210) and the Written Opinion of the International Searching Authority (Form PCT/ISA/237) dated Aug. 1, 2017, by the European Patent Office in corresponding International Application No. PCT/US2017/035879. (11 pages).

*Primary Examiner* — Thu V Huynh
(74) *Attorney, Agent, or Firm* — Buchanan Ingersoll & Rooney PC

(57) ABSTRACT

A method for identification and distribution of a personalized image. As disclosed, the method involves a processing server receiving an image request from a web server. The image request includes at least a device identifier and an originating address. The processing server electronically transmits a data request to a computing device associated with the device identifier, and receives a data file from the computing device. The data file includes one or more data values associated with an electronic wallet. The processing server executes a query to identify an image file based on the data values included in the received data file. Additionally, the processing server electronically transmits the identified image file to the web server in response to the received image request.

18 Claims, 10 Drawing Sheets

(51) Int. Cl.
  *G06Q 20/36*   (2012.01)
  *G06F 16/957*  (2019.01)

(56) References Cited

U.S. PATENT DOCUMENTS

| | | | | |
|---|---|---|---|---|
| 9,754,245 B1* | 9/2017 | Davison | | G06Q 20/12 |
| 2009/0006530 A1* | 1/2009 | Martin | | H04L 67/26 |
| | | | | 709/203 |
| 2009/0063493 A1* | 3/2009 | Fukata | | G03G 15/5066 |
| 2009/0077168 A1* | 3/2009 | Sadasue | | G06F 16/51 |
| | | | | 709/203 |
| 2011/0296509 A1* | 12/2011 | Todorov | | G06F 21/36 |
| | | | | 726/7 |
| 2012/0203605 A1* | 8/2012 | Morgan | | G06Q 20/4014 |
| | | | | 705/14.17 |
| 2012/0278155 A1* | 11/2012 | Faith | | G06Q 20/40145 |
| | | | | 705/14.26 |
| 2014/0244451 A1* | 8/2014 | Mayer | | G06Q 40/12 |
| | | | | 705/30 |
| 2014/0304642 A1* | 10/2014 | Santos | | G06F 16/48 |
| | | | | 715/780 |
| 2015/0019944 A1* | 1/2015 | Kalgi | | G06Q 20/20 |
| | | | | 715/205 |
| 2015/0262213 A1* | 9/2015 | Mercer | | G06Q 30/02 |
| | | | | 705/14.26 |
| 2015/0287021 A1* | 10/2015 | Itwaru | | G06Q 20/3276 |
| | | | | 705/44 |
| 2016/0012428 A1* | 1/2016 | Haldenby | | G06Q 20/383 |
| | | | | 705/39 |
| 2016/0019545 A1 | 1/2016 | Vastenavondt et al. | | |
| 2016/0042263 A1* | 2/2016 | Gaddam | | G06K 19/06037 |
| | | | | 235/494 |
| 2016/0104146 A1 | 4/2016 | Peyton et al. | | |
| 2016/0132868 A1* | 5/2016 | Butcher | | G06Q 20/36 |
| | | | | 705/21 |
| 2016/0232518 A1* | 8/2016 | Butler, IV | | G06Q 20/3572 |
| 2016/0239840 A1* | 8/2016 | Preibisch | | G06Q 20/3829 |
| 2016/0283946 A1* | 9/2016 | Laporta | | G06Q 20/40145 |
| 2017/0032412 A1* | 2/2017 | Scharber | | G06F 16/24573 |
| 2017/0085586 A1* | 3/2017 | Ikeda | | G06F 13/00 |
| 2017/0202040 A1* | 7/2017 | Chatterton | | G06Q 20/3278 |
| 2017/0323299 A1* | 11/2017 | Davis | | G06Q 20/40145 |
| 2017/0337652 A1* | 11/2017 | Sarin | | G06Q 50/265 |

* cited by examiner

METHOD AND SYSTEM FOR DYNAMIC DISPLAY OF PERSONALIZED IMAGES

FIELD

The present disclosure relates to the dynamic display, distribution, and storage of personalized images, specifically the analysis of data related to a computing device user's electronic wallet to identify a personalized image related to the wallet and payment products used by the user for display to the user during the checkout process for an electronic payment transaction, including the distribution of tokens and secured storage of tokens and personalized images in the computing device.

BACKGROUND

The number of electronic wallets being used by consumers has greatly increased over time. As technology has improved, making the use of electronic wallets more secure, consumers have begun to take advantage of the convenience and security that electronic wallets have to offer, enabling the consumer to engage in electronic payment transactions, both in person and remotely (e.g., in e-commerce transactions), without having to carry around payment cards or be constantly entering payment information into their computing device. Some electronic wallets also offer additional benefits to provide the consumer with further incentives to use the wallet, such storing digital records of their transactions, providing offers and other deals, etc.

Due to the advantages of electronic wallets, many issuers and other financial institutions that issue transaction accounts to consumers have a great interest in providing electronic wallets to their customers. Generally, issuers have two options for providing electronic wallets to customers: partner with an existing electronic wallet provider, or develop and use and their own electronic wallet. In the former instance, the issuer can take advantage of an existing wallet and its infrastructure, but often lacks the ability to customize the electronic wallet with branding and other features that may be desired, or in some instances necessary, for consumer recognition. In the latter instance, the issuer may be required to spend significant technological resources to develop the wallet, and then must contact every merchant individually to manage acceptance and use of their wallet.

Furthermore, as the number of electronic wallets rises, consumers are faced with the difficulty of deciding on which electronic wallet to use. Currently, many electronic wallets lack individualization that can be seen in other industries, which may hinder consumers' ability to choose. Individualization options may also be beneficial in providing an added level of security. For instance, fake websites and other fraud techniques are often used to trick a consumer into providing their payment details to the website, such as by posing as their electronic wallet provider. In such cases, the display of data related to individualization options can provide a consumer with peace of mind that the website they are visiting and using their electronic wallet at is genuine.

Thus, there is a need for a technological solution whereby personalized images may be presented to a user of an electronic wallet that are associated with the wallet itself, that may be indicative of the branding of the electronic wallet or payment product being used, which may provide for an additional security layer in the environment and added assurance to the use of the authenticity of the electronic wallet.

SUMMARY

The present disclosure provides a description of systems and methods for the identification, distribution, and storage of personalized images. The personalized images may be personalized with respect to the branding of an electronic wallet and/or payment product being used, enabling an issuing financial institution to take advantage of an existing electronic wallet product and infrastructure, while still ensuring that the wallet reflects their branding for both additional exposure and to ensure that the user can easily identify the wallet as a payment method. The issuer may thus provide a personalized electronic wallet to their customers, without the need to contact every merchant for adoption of the electronic wallet and updating the implementation if branding is changed or a new payment product is added.

A method for identification and distribution of a personalized image includes: receiving, by a receiving device of a processing server, an image request from a web server, wherein the image request includes at least a device identifier and an originating address; electronically transmitting, by a transmitting device of the processing server, a data request to a computing device associated with the device identifier; receiving, by the receiving device of the processing server, a data file from the computing device, wherein the data file includes one or more data values associated with an electronic wallet; executing, by a querying module of the processing server, a query to identify an image file based on the data values included in the received data file; and electronically transmitting, by the transmitting device of the processing server, the identified image file to the web server in response to the received image request.

A method for distribution of a personalized image includes: receiving, by a receiving device of a processing server, a token request from a computing device, wherein the token request includes at least an image data file and a device identifier associated with the computing device; generating, by a generation module of the processing server, a digital token unique to the image data file; executing, by a querying module of the processing server, a query on an image database of the processing server to insert into the image database a new image profile, wherein the new image profile includes at least the generated digital token and the image data file; and electronically transmitting, by a transmitting device of the processing server, at least the generated digital token to the computing device.

A method for storage of a personalized image includes: storing, in a memory of a computing device, at least an image data file and a device identifier associated with the computing device; electronically transmitting, by a transmitting device of the computing device, the image data file and the device identifier to a processing server; receiving, by a receiving device of the computing device, a verification message, wherein the verification message includes at least an indication of approval and a verified image data file; and executing, by a querying module of the computing device, a query on a secured storage of the computing device to insert at least the verified image data file into the secured storage.

A system for identification and distribution of a personalized image includes: a querying module of a processing server; a receiving device of the processing server configured to receive an image request from a web server, wherein the image request includes at least a device identifier and an originating address; and a transmitting device of the processing server configured to electronically transmit a data request to a computing device associated with the device identifier. The receiving device of the processing server is further configured to receive a data file from the computing device, wherein the data file includes one or more data values associated with an electronic wallet. The querying module of the processing server is configured to execute a query to identify an image file based on the data values included in the received data file. The transmitting device of the processing server is further configured to electronically transmit the identified image file to the web server in response to the received image request.

A system for distribution of a personalized image includes: a receiving device of a processing server configured to receive a token request from a computing device, wherein the token request includes at least an image data file and a device identifier associated with the computing device; a generation module of the processing server configured to generate a digital token unique to the image data file; a querying module of the processing server configured to execute a query on an image database of the processing server to insert into the image database a new image profile, wherein the new image profile includes at least the generated digital token and the image data file; and a transmitting device of the processing server configured to electronically transmit at least the generated digital token to the computing device.

A system for storage of a personalized image includes: a memory of a computing device configured to store at least an image data file and a device identifier associated with the computing device; a transmitting device of the computing device configured to electronically transmit the image data file and the device identifier to a processing server; a receiving device of the computing device configured to receive a verification message, wherein the verification message includes at least an indication of approval and a verified image data file; and a querying module of the computing device configured to execute a query on a secured storage of the computing device to insert at least the verified image data file into the secured storage.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Transaction Account—A financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by PayPal®, etc.

Merchant—An entity that provides products (e.g., goods and/or services) for purchase by another entity, such as a consumer or another merchant. A merchant may be a consumer, a retailer, a wholesaler, a manufacturer, or any other type of entity that may provide products for purchase as will be apparent to persons having skill in the relevant art. In some instances, a merchant may have special knowledge in the goods and/or services provided for purchase. In other instances, a merchant may not have or require any special knowledge in offered products. In some embodiments, an entity involved in a single transaction may be considered a merchant. In some instances, as used herein, the term "merchant" may refer to an apparatus or device of a merchant entity.

Issuer—An entity that establishes (e.g., opens) a letter or line of credit in favor of a beneficiary, and honors drafts drawn by the beneficiary against the amount specified in the letter or line of credit. In many instances, the issuer may be a bank or other financial institution authorized to open lines of credit. In some instances, any entity that may extend a line of credit to a beneficiary may be considered an issuer. The line of credit opened by the issuer may be represented in the form of a payment account, and may be drawn on by the beneficiary via the use of a payment card. An issuer may also offer additional types of payment accounts to consumers as will be apparent to persons having skill in the relevant art, such as debit accounts, prepaid accounts, electronic wallet accounts, savings accounts, checking accounts, etc., and may provide consumers with physical or non-physical means for accessing and/or utilizing such an account, such as debit cards, prepaid cards, automated teller machine cards, electronic wallets, checks, etc.

System for Dynamic Display of Personalized Images

Figure 1:
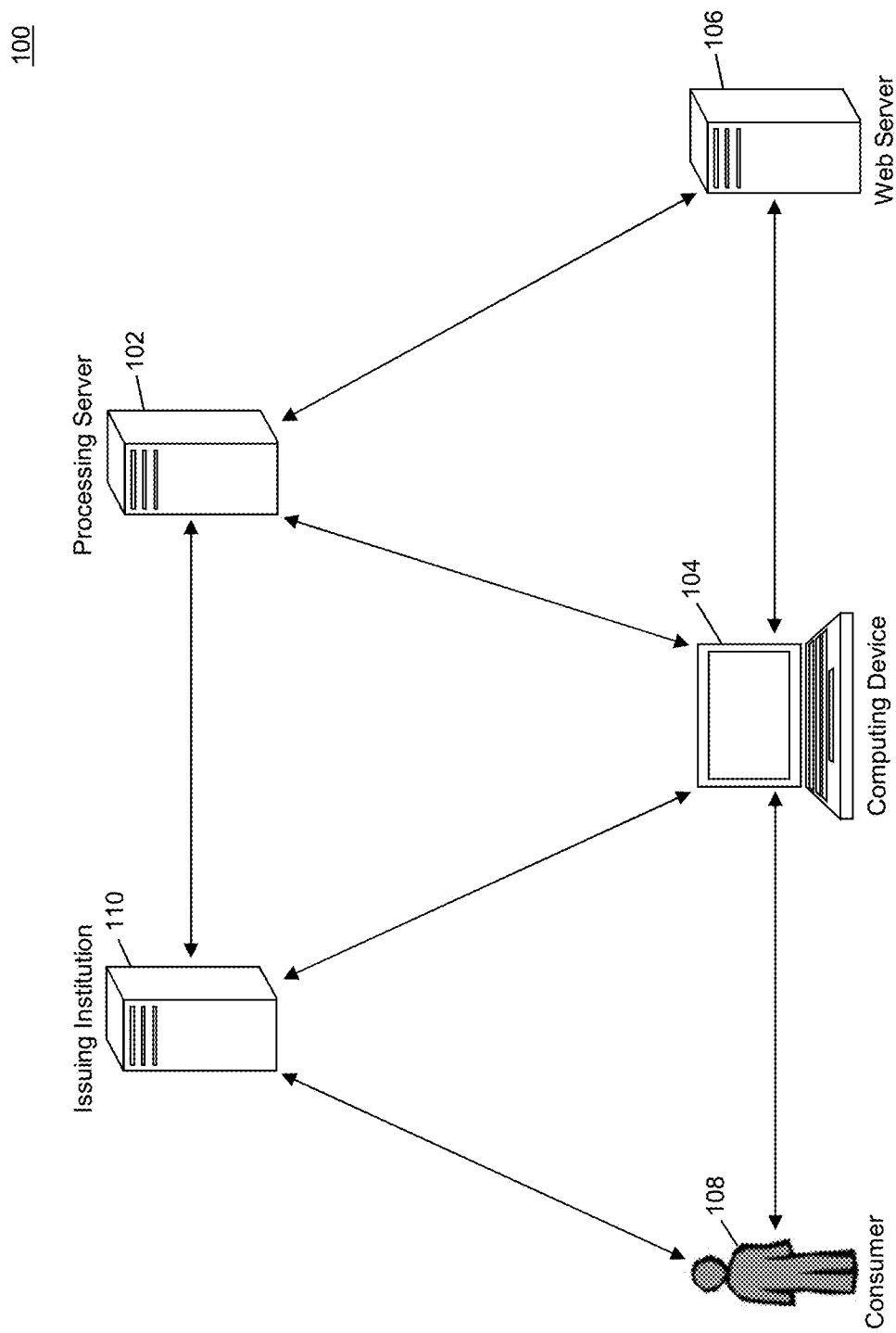
FIG. 1 is a block diagram illustrating a high level system architecture for the dynamic display of personalized images related to an electronic wallet in accordance with exemplary embodiments.

FIG. 1 illustrates a system 100 for the identification and distribution of personalized images related to an electronic wallet for dynamic display and the secured storage of said images in a computing device.

The system 100 may include a processing server 102. The processing server 102, discussed in more detail below, may be configured to dynamically identify and distribute personalized images for display on a computing device 104. The personalized images may be personalized with respect to an electronic wallet identified for use in funding an electronic payment transaction. The computing device 104 may be configured to navigate to a web page hosted or otherwise associated with a web server 106. The computing device 104, discussed in more detail below, may be any type of computing device 104 suitable for navigating to web pages and configured to receive input regarding the selection of an electronic wallet for use in funding a payment transaction initiated via a web page, such as a desktop computer, laptop computer, notebook computer, tablet computer, cellular phone, smart phone, smart watch, smart television, wearable computing device, implantable computing device, etc.

In the system 100, a consumer 108, as a user of the computing device 104, may instruct the computing device 104 to navigate to a web page hosted by the web server 106 for or on behalf of a merchant with whom the consumer 108 may transact. As part of the navigation to the web page, the computing device 104 may request web page data from the web server 106 for display on a display device connected therewith to the consumer 108. The web server 106 may identify the web page data for the requested web page, which may be electronically transmitted to the computing device 104 for display via a web browsing application program using traditional methods and systems that will be apparent to persons having skill in the relevant art.

The web page navigated to by the computing device 104 may be a web page associated with a merchant that may be used to initiate a payment transaction with the merchant. As part of the initiation of the payment transaction, the consumer 108 may, via the web page displayed using the computing device 104, be presented with a plurality of payment options, where at least one of the payment options includes the use of an electronic wallet. The electronic wallet may be managed by, operated by, or otherwise associated with the processing server 102. For instance, the processing server 102 may manage an electronic wallet that may be utilized by a plurality of issuing institutions 110. In another example, the processing server 102 may use application program interfaces (APIs) that may be utilized by an issuing institution 110 to operate an electronic wallet that may be used by customers of the issuing institution 110 (e.g., consumers 108) in funding payment transactions. Issuing institutions 110 may be financial institutions, such as issuing banks, or other entities configured to issue transaction accounts to consumers 108 for use in funding electronic payment transactions. In some embodiments, the processing server 102 may be a part of an issuing institution 110.

As part of the retrieval of the web page data for the web page navigated to by the computing device 104, the web server 106 may request an image from the processing server 102 for display, such as to represent a button, link, or other selection option for the user of the web page (e.g., the consumer 108) to select the electronic wallet as a payment option. The processing server 102, using the methods discussed herein, may be configured to identify an image personalized with the consumer 108 and/or the electronic wallets available to the consumer 108 for funding of a payment transaction that may be initiated via the web page.

As part of the request for an image, the web server 106 may provide the processing server 102 with a device identifier associated with the computing device 104 that is navigating to the web page. The device identifier may be a unique value associated with the computing device 104 for identification thereof, such as a media access control address, internet protocol address, identification number, registration number, serial number, etc. The processing server 102 may, using the device identifier, electronically transmit a data request to the computing device 104 using a suitable communication network, such as the Internet, a cellular communication network, etc. The computing device 104 may receive the data request and may identify a data file for electronic transmission back to the processing server 102. In exemplary embodiments, the data file may be a cookie, which may be directly requested by the processing server 102 in the data request, such as via an identifier associated with the cookie being included in the data request. The computing device 104 may identify the data file and electronically transmit it to the processing server 102 using the same or an alternative, yet suitable, communication network and method. In some embodiments, the computing device 104 may supply the data file in the initial retrieval of web page data, which may be provided to the processing server 102 (e.g., by the web server 106) as part of the initial image request.

The processing server 102 may receive the cookie or other data file and parse and identify the data included therein. The data file may include at least a wallet identifier, which may be a unique value associated with an electronic wallet used in identification thereof. For example, the processing server 102 may operate or otherwise be associated with a plurality of electronic wallets, such as by operating a "network" of electronic wallets for a plurality of different issuing institutions 110. The processing server 102 may assign or otherwise associated identification values with each of the associated electronic wallets, where the identification value for an electronic wallet associated with the consumer 108 may be included in the data file received from the computing device 104.

The processing server 102 may then identify an image file that is associated with the wallet identifier included in the data file. The image file may be identified via any suitable method, such as the use of a look-up table where the image file, or a reference locator indicative thereof, is directly associated with the wallet identifier. The image file may be an image that is provided by or otherwise indicated by the associated issuing institution 110 to represent the corresponding electronic wallet. Once the image file is identified, the processing server 102 may electronically transmit the image file back to the web server 106 using a suitable communication network and method. The web server 106 may then display the personalized image as the selection option for selection of the electronic wallet.

In some embodiments, the data file provided by the computing device 104 may include a plurality of different data values for use by the processing server 102 in identification of a personalized image. For instance, in one embodiment, the plurality of data values may include a wallet identifier as well as a brand identifier, such as for instances where an issuing institution 110 may have multiple payment products available in an electronic wallet. In such an instance, an image associated with the indicated brand (e.g., payment product) of the indicated electronic wallet may be identified for transmission to the web server 106 and eventual display to the consumer 108. Additional, or alternative, data values that may be used in the identification of a personalized image related to an electronic wallet may include, for example, a product identifier, an account identifier, a product name, merchant identifier, etc.

In some cases, the identified image may be specifically associated with the consumer 108. For example, the consumer 108 may use a custom image for the background of a payment card issued to the consumer 108 for a transaction account issued by the issuing institution 110. In such an example, the processing server 102 may identify the consumer's custom image for electronic transmission to the web server 106 for display to the consumer 108. In another example, the image file may include the last four digits of the consumer's preferred transaction account or other image that may be used by the consumer 108 for recognition of the payment method as being associated with a specific transaction account associated with the consumer 108. In yet another example, the image file may include or be comprised of a custom personalized image. For instance, the consumer 108 may upload a custom image, such as a known photograph or portrait, or select an image from a plurality of different images to serve as a personalized image during registration of the electronic wallet. Display of the custom image may illustrate, for instance, that the web site or application program is genuine. In some cases, the custom image may be used in conjunction with another image, such as an image associated with the electronic wallet, issuing institution 110, etc. For example, the custom image may be displayed next to a brand image associated with the issuing institution 110 or payment product.

In some embodiments, the consumer 108 may be associated with multiple electronic wallets that are associated with the processing server 102. In some such embodiments, the processing server 102 may identify an image file associated with each of the electronic wallets, and may electronically transmit a combined image file to the web server 106 that includes images associated with each of the electronic wallets. In other such embodiments, the processing server 102 may identify a generic image file not directly associated with any of the electronic wallets prior to selection by the consumer 108 of a specific electronic wallet used for a payment transaction. Once the consumer 108 has selected a specific electronic wallet, the wallet identifier for the electronic wallet may be stored in the data file, which may result in the image file associated with that electronic wallet being displayed on future visits to the web page or other related web pages.

In some embodiments, the processing server 102 may be configured to store data associated with a consumer's electronic wallet selections for use in identification of image files for future visits to the web page or to other web pages where the consumer 108 may be requested to select a payment method including an electronic wallet. In such embodiments, the data file provided by the computing device 104 may include a token value. The token value may be a unique identification value that is unique to the consumer 108 and/or the computing device 104 that may be used as a reference by the processing server 102 for future identification of image files, such as a random or pseudo-random alphanumeric value. For example, the consumer 108 may provide a personalized image to the processing server 102 (e.g., via the computing device 104), for use in the methods and systems discussed herein. The processing server 102 may generate a digital token that is unique for the personalized image. The processing server 102 may store the token value in a database with the wallet identifier and any other data values associated therewith. When the consumer 108 visits another web page via the computing device 104 for which an image file is requested, the computing device 104 may electronically transmit the digital token to the processing server 102 (e.g., via a cookie or other data transmission mechanism), which, in some instances, may be transmitted through the web server 106. The processing server 102 may identify the digital token value and then identify the associated image file (e.g., stored with the token value in the database) to be distributed to the web server 106. In some such embodiments, the computing device 104 may be configured to electronically transmit the token value to the web server 106 as part of the page request, which may be transmitted to the processing server 102 in the image request. In such an embodiment, the processing server 102 may be able to identify the image file without receiving the data file from the computing device 104 each time the image file is requested.

In some cases, the processing server 102 may be configured to authenticate a web page and/or web server 106 prior to electronic transmission of the digital token value or image data file thereto. For instance, the web server 106 may provide the processing server 102 with a unique value (e.g., cookie, internet protocol address, registration number, digital token, digital signature, security certificate, etc.) that may be authenticated by the processing server 102 to ensure that the web server 106 is genuine and to prevent the receipt of digital tokens and personalized images by unauthorized web sites. In such cases, web servers 106 may register with the processing server 102 prior to being eligible for the receipt of digital tokens and personalized images, where authentication information may be distributed, generated, or otherwise identified.

In some further embodiments, the processing server 102 may be configured to update the wallet identifier or other data values associated with a consumer 108 and/or computing device 104 based on transaction behavior. For instance, once the consumer 108 participates in an electronic payment transaction, the processing server 102 may receive data from the issuing institution 110 or other entity involved in the payment transaction, such as a payment network, and may update the wallet identifier or other data values to reflect the payment product used by the consumer 108 in funding the payment transaction. In such embodiments, the image file displayed to the consumer 108 on further visits to the web page or on visits to other web pages may reflect their most recently used payment product.

In exemplary embodiments, the web page data identified by the web server 106 for the web page navigated to by the computing device 104 may include a static uniform resource locator (URL) or other reference for the image file to be provided by the processing server 102. For instance, the web page data may include a static URL that points to an image file hosted by or otherwise associated with the processing server 102, where the image request is conveyed via a request transmitted by the web server 106 to the URL to retrieve the indicated image. In such an instance, the image returned by the URL would be the image file identified by the processing server 102 using the methods discussed herein. In such instances, the web server 106 may be able to display the personalized image without modification to the web page data and without the execution of any additional scripts, which may enable the implementation of the methods discussed herein without any participation by merchants or web servers 106. In other embodiments, a dynamic URL may be used, where the URL may change to an image file identified using the methods discussed herein.

In some embodiments, the URL may be directed to a location on the computing device 104. In such embodiments, the personalized image files may be stored locally in the computing device 104 or in another location accessible via the computing device 104, such as using a local area network. The processing server 102 may identify the personalized image file for display and may return a URL that is directed to the identified personalized image for stored in, or accessed via, the computing device 104. The web page or application data may then locate the personalized image file and display it on the display of the computing device 104 to the consumer 108 as part of the web page or application program display. In some cases, the personalized image files may be stored in a memory allocated to the application program used to view the data, such as the web browsing application program or application program associated with the merchant. In other cases, the personalized image files may be stored in the same location as the application program, such as stored in a secure element or other secured storage used to store payment credentials and other data associated with an electronic wallet.

In some embodiments, the consumer 108 may submit an image file to the processing server 102 (e.g., via the computing device 104) for verification prior to use in the methods discussed herein. In such embodiments, the image file may be stored in a standard memory of the computing device 104, and may be electronically transmitted to the processing server 102 via a suitable communication method. The processing server 102 may receive the image file and may verify it for use. Verification may include verifying that the image file complies with one or more rules regarding the use of personalized images. For instance, the processing server 102 may check the image file for unauthorized use of copyrighted material, obscene material, or other instances where the image file may be determined unfit for usage. In some instances, the processing server 102 may be configured to edit an image file for compliance with applicable rules, such as by blurring or obscuring copyrighted material.

The processing server 102 may return the verified (e.g., and edited, if applicable) image file back to the computing device 104. The computing device 104 may then store the verified image file in a secure storage of the computing device 104, which may be separate from or a specified portion of the standard memory. The secure storage may be, for instance a Secure Element, trusted encryption environment, or other suitable type of secured storage that will be apparent to persons having skill in the relevant art. In some embodiments, the verified image file may be encoded with data indicating its verification, such as exif data that includes a tag indicating that the image file has been verified by the processing server 102. In such instances, the web server 106 or computing device 104 may be configured to provide such data or indications thereof to the consumer 108 when presenting the image. As a result, the consumer 108 may be sure that the verified image is being presented for use in confirming their payment method. In addition, the use of the secured storage for the verified image file may ensure that the image file is not compromised, to further increase account security of the consumer 108.

The methods and systems discussed herein may enable the processing server 102 to dynamically identify and distribute image files for display on a web page that are associated with an electronic wallet and/or payment products associated therewith. The methods discussed herein may further enable the processing server 102 to identify an image file for an electronic wallet even in instances where a plurality of different electronic wallets may be associated with the processing server 102 and/or available to a consumer 108 for selection as a payment method via the web page. As a result, an issuing institution 110 may be able to have customized branding for display to the consumer 108 for their electronic wallet, without requiring the issuing institution 110 to develop its own, custom electronic wallet, and thus negating the need for the issuing institution 110 to work with every merchant for enabling the use of their electronic wallet on the merchant's web page. In addition, the use of static URLs and the processing server 102 may enable an issuing institution 110 to update the branding of their payment products without having to contact web servers 106 or merchants, by simply providing the new image file to the processing server 102. As a result, web servers 106, merchants, and issuing institutions 110 may all be able to take advantage of the dynamic display of personalized images with minimal participation due to the technological solutions provided by the processing server 102.

Processing Server

Figure 2:
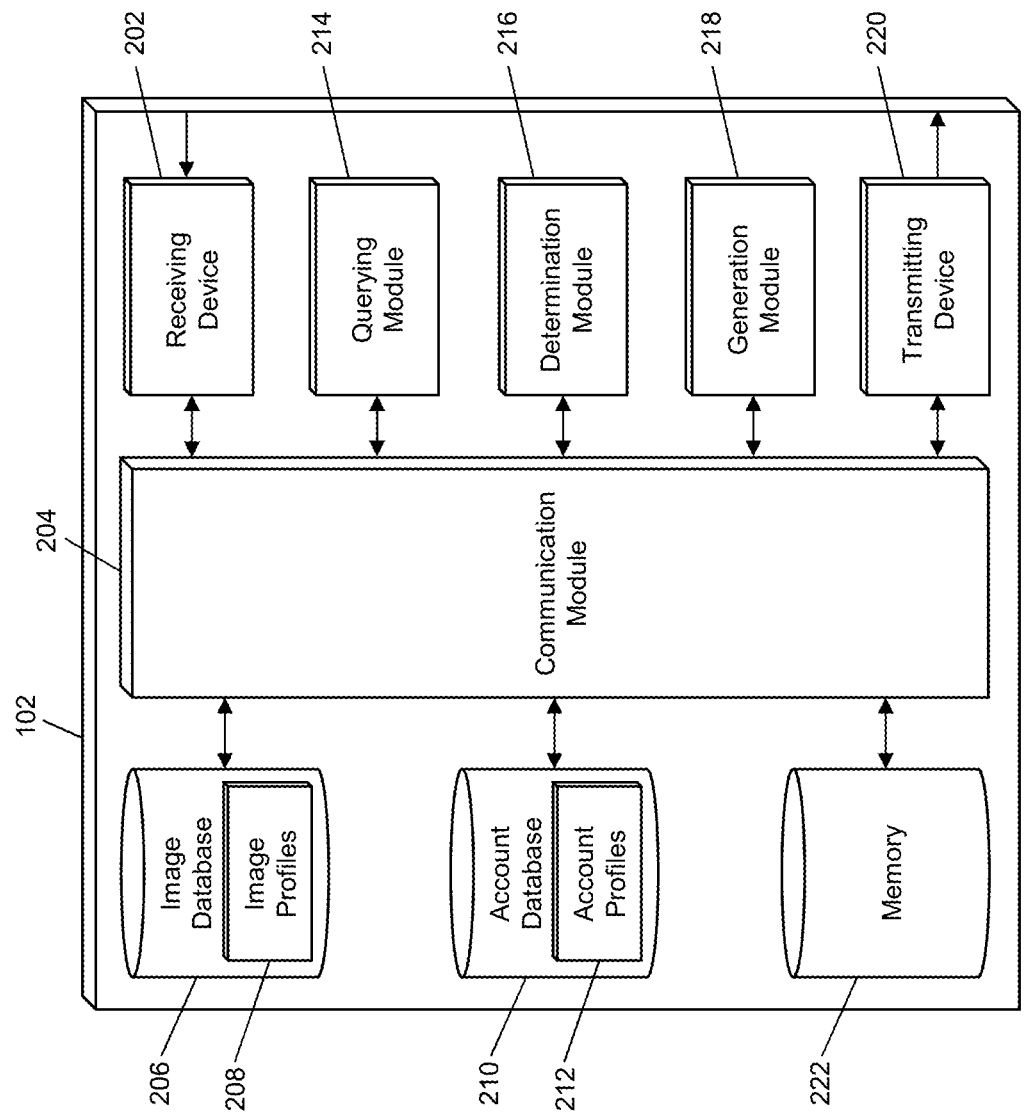
FIG. 2 is a block diagram illustrating the processing server of FIG. 1 for the dynamic display of personalized images related to an electronic wallet and distribution of tokens associated therewith in accordance with exemplary embodiments.

FIG. 2 illustrates an embodiment of a processing server 102 in the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 1000 illustrated in FIG. 10 and discussed in more detail below may be a suitable configuration of the processing server 102.

The processing server 102 may include a receiving device 202. The receiving device 202 may be configured to receive data over one or more networks via one or more network protocols. In some embodiments, the receiving device 202 may be configured to receive data from computing devices 104, web servers 106, issuing institutions 110, and other entities via one or more communication networks, such as local area networks, cellular communication networks, the Internet, etc. In some embodiments, the receiving device 202 may be comprised of multiple devices, such as different receiving devices for receiving data over different networks, such as a first receiving device for receiving data over a local area network and a second receiving device for receiving data over the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by web servers 106 that may be superimposed or otherwise encoded with image requests. Image requests may include at least a device identifier associated with a computing device 104 for which the image is requested and an originating address associated with the web server 106 that electronically transmits the image request. In some instances, an image request may also include, or the device identifier may be comprised of, a token value. The receiving device 202 may also be configured to receive data signals electronically transmitted by computing devices 104, which may be superimposed or otherwise encoded with data files, such as cookies, image files, digital tokens, etc., that may include data values used in the identification of image files. The receiving device 202 may also be configured to receive data signals electronically transmitted by issuing institutions 110, such as may be superimposed or otherwise encoded with image files or data associated therewith, for use by the processing server 102 in identifying and distributing image files.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 214, determination module 216, generation 218, etc. As used herein, the term "module" may be software or hardware particularly programmed to receive an input, perform one or more processes using the input, and provide an output. The input, output, and processes performed by various modules will be apparent to one skilled in the art based upon the present disclosure.

The processing server 102 may include an image database 206. The image database 206 may be configured to store a plurality of image profiles 208 using a suitable data storage format and schema. The image database 206 may be a relational database that utilizes structured query language for the storage, identification, modifying, updating, accessing, etc. of structured data sets stored therein. Each image profile 208 may be a structured data set configured to store data related to a dynamically displayed image. Each image profile 208 may include at least an image file or reference locator that points to an image file and one or more data values associated therewith. The one or more data values may correspond to data values included in data files received from computing devices 104, which may include, for example, wallet identifiers, brand identifiers, product identifiers, merchant identifiers, etc. In some embodiments, an image profile 208 may be configured to store a digital token associated therewith. In some cases, image files stored in the image profiles 208 may be verified image files, which may be encoded with data indicating verification by the processing server 102.

In some embodiments, the processing server 102 may also include an account database 210. The account database 210 may be configured to store a plurality of account profiles 212 using a suitable data storage format and schema. The account database 210 may be a relational database that utilizes structured query language for the storage, identification, modifying, updating, accessing, etc. of structured data sets stored therein. Each account profile 212 may be a structured data set configured to store data related to a consumer 108, computing device 104, and/or account related to one or more electronic wallets. Each account profile 212 may include at least a token value and one or more data values. The token value may be a unique value suitable for use in identification of the respective account profile 212. The one or more data values may correspond to data values in data files received from computing devices 104 and included in image profiles 208 for identification of image files.

The processing server 102 may include a querying module 214. The querying module 214 may be configured to execute queries on databases to identify information. The querying module 214 may receive one or more data values or query strings, and may execute a query string based thereon on an indicated database, such as the image database 206, to identify information stored therein. The querying module 214 may then output the identified information to an appropriate engine or module of the processing server 102 as necessary. The querying module 214 may, for example, execute a query on the image database 206 to identify an image profile 208 to identify an image file for distribution to a web server 106, where the image profile 208 may be identify based on a correspondence between the included one or more data values and data values read from a received data file or corresponding account profile 212.

The processing server 102 may also include a determination module 216. The determination module 216 may be configured to perform determinations based on data input into the determination module 216. The determination module 216 may receive data and instructions, may perform one or more determinations as instructed using the input data, and may output a result of the determination(s) to another module or engine of the processing server 102. For example, the determination module 216 may be configured to determine an image file for distribution to a web server 106 based on an image request (e.g., received via the receiving device 202). The determination module 216 may design a query for execution by the querying module 214 based on the image request to identify an image profile 208 stored in the image database 206 and identify the image file included or otherwise indicated therein for distribution to the web server 106. The determination module 216 may also be configured to determine compliance of an image file received by the processing server 102 (e.g., via the receiving device 202) with one or more image qualification rules, such as by analyzing properties of the image file and comparing them with the image qualification rules to determine compliance therewith.

The processing server 102 may also include a generation module 218. The generation module 218 may be configured to generate data for use in performing the functions of the processing server 102 discussed herein. The generation module 218 may receive an instruction as input, may generate data based on the instruction, and may output the generated data to another module or engine of the processing server 102. In some instances, the generation module 218 may also receive data as input, which may be used in the generation, and may also be configured to identify data for use in the generation, such as by generating instructions for execution by the querying module 214. The generation module 218 may be configured to, for example, generate data requests for electronic transmission to computing devices 104, generate data signals superimposed or otherwise encoded with image files for electronic transmissions to web servers 106, etc. The generation module 218 may also be configured to generate digital tokens, such as may be associated with an image file for use in the identification thereof. In some instances, the generation module 218 may be further configured to generate modified image files, such as via modifying an image file to indication verification thereof, and/or to modify an image file for compliance with one or more image qualification rules, such as by removing objectionable material from an image file submitted by a consumer 108.

The processing server 102 may also include a transmitting device 220. The transmitting device 220 may be configured to transmit data over one or more networks via one or more network protocols. In some embodiments, the transmitting device 220 may be configured to transmit data to computing devices 104, web servers 106, issuing institutions 110, and other entities via one or more networks, such as local area networks, cellular communication networks, the Internet, etc. In some embodiments, the transmitting device 220 may be comprised of multiple devices, such as different transmitting devices for transmitting data over different networks, such as a first transmitting device for transmitting data over a local area network and a second transmitting device for transmitting data over the Internet. The transmitting device 220 may electronically transmit data signals that have data superimposed that may be parsed by a receiving computing device. In some instances, the transmitting device 220 may include one or more modules for superimposing, encoding, or otherwise formatting data into data signals suitable for transmission.

The transmitting device 220 may be configured to electronically transmit data signals to computing devices 104 that are superimposed or otherwise encoded with data requests, digital tokens, or verified image files, as applicable. The data requests may be requests for data files, which may include identification values for use in identification thereof, such as cookie names, cookie identifiers, token values, etc. The transmitting device 220 may also be configured to electronically transmit data signals to web servers 106 that are superimposed or otherwise encoded with image files, for display to a consumer 108 via an associated computing device 104. In some instances, the transmitting device 220 may be configured to electronically transmit data signals to issuing institutions 110, such as to request data value information, image files, etc.

The processing server 102 may also include a memory 222. The memory 222 may be configured to store data for use by the processing server 102 in performing the functions discussed herein. The memory 222 may be configured to store data using suitable data formatting methods and schema and may be any suitable type of memory, such as read-only memory, random access memory, etc. The memory 222 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 222 may be comprised of or may otherwise include a relational database that utilizes structured query language for the storage, identification, modifying, updating, accessing, etc. of structured data sets stored therein. The memory 222 may be configured to store, for example, image qualification rules for use in determining compliance of submitted personalized images.

Computing Device

Figure 3:
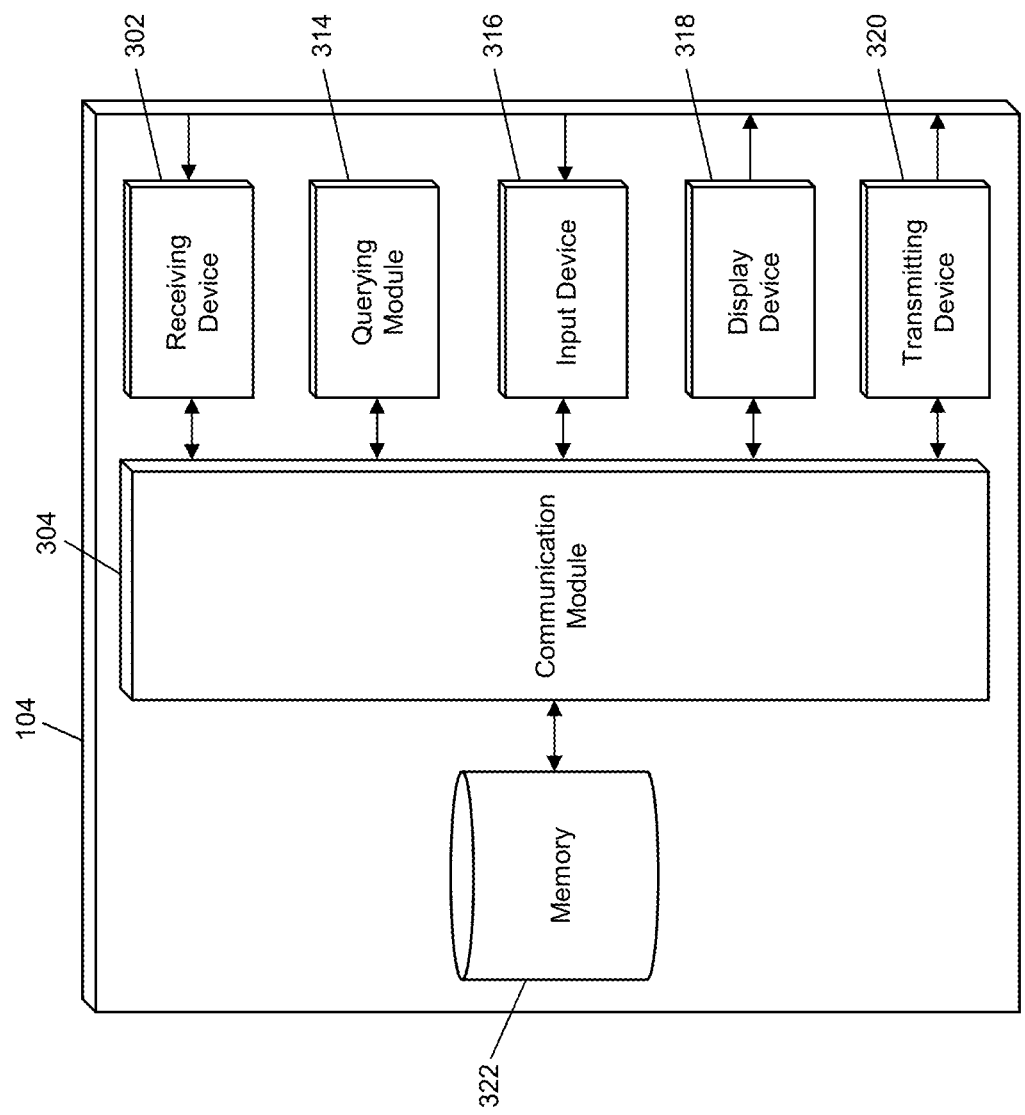
FIG. 3 is a block diagram illustrating the computing device of FIG. 1 for storage of a verified personalized image related to an electronic wallet in accordance with exemplary embodiments.

FIG. 3 illustrates an embodiment of a computing device 104 in the system 100. It will be apparent to persons having skill in the relevant art that the embodiment of the computing device 104 illustrated in FIG. 3 is provided as illustration only and may not be exhaustive to all possible configurations of the computing device 104 suitable for performing the functions as discussed herein. For example, the computer system 1000 illustrated in FIG. 10 and discussed in more detail below may be a suitable configuration of the computing device 104.

The computing device 104 may include a receiving device 302. The receiving device 302 may be configured to receive data over one or more networks via one or more network protocols. In some embodiments, the receiving device 302 may be configured to receive data from processing servers 102, web servers 106, issuing institutions 110, and other entities via one or more communication networks, such as local area networks, cellular communication networks, the Internet, etc. In some embodiments, the receiving device 302 may be comprised of multiple devices, such as different receiving devices for receiving data over different networks, such as a first receiving device for receiving data over a local area network and a second receiving device for receiving data over the Internet. The receiving device 302 may receive electronically transmitted data signals, where data may be superimposed or otherwise encoded on the data signal and decoded, parsed, read, or otherwise obtained via receipt of the data signal by the receiving device 302. In some instances, the receiving device 302 may include a parsing module for parsing the received data signal to obtain the data superimposed thereon. For example, the receiving device 302 may include a parser program configured to receive and transform the received data signal into usable input for the functions performed by the processing device to carry out the methods and systems described herein.

The receiving device 302 may be configured to receive data signals electronically transmitted by processing servers 102, such as may be superimposed or otherwise encoded with digital tokens associated with image files, verified image files for storage in the computing device 104, and image files identified based on submitted digital tokens. The receiving device 302 may also be configured to receive data signals electronically transmitted by web servers 106, which may be superimposed or otherwise encoded with web page data, which may include image files previously submitted by the computing device 104. The receiving device 302 may also receive data signals electronically transmitted by issuing institutions 110, such as may be superimposed or otherwise encoded with payment credentials being provisioned to the computing device 104 for use in an electronic wallet application program for use in electronic payment transactions.

The computing device 104 may also include a communication module 304. The communication module 304 may be configured to transmit data between modules, engines, databases, memories, and other components of the computing device 104 for use in performing the functions discussed herein. The communication module 304 may be comprised of one or more communication types and utilize various communication methods for communications within a computing device. For example, the communication module 304 may be comprised of a bus, contact pin connectors, wires, etc. In some embodiments, the communication module 304 may also be configured to communicate between internal components of the computing device 104 and external components of the computing device 104, such as externally connected databases, display devices, input devices, etc. The computing device 104 may also include a processing device. The processing device may be configured to perform the functions of the computing device 104 discussed herein as will be apparent to persons having skill in the relevant art. In some embodiments, the processing device may include and/or be comprised of a plurality of engines and/or modules specially configured to perform one or more functions of the processing device, such as a querying module 314, etc. As used herein, the term "module" may be software or hardware particularly programmed to receive an input, perform one or more processes using the input, and provide an output. The input, output, and processes performed by various modules will be apparent to one skilled in the art based upon the present disclosure.

The computing device 104 may include a querying module 314. The querying module 314 may be configured to execute queries on databases to identify information. The querying module 314 may receive one or more data values or query strings, and may execute a query string based thereon on an indicated database, such as a memory 322, to identify information stored therein. The querying module 314 may then output the identified information to an appropriate engine or module of the computing device 104 as necessary. The querying module 314 may, for example, execute a query on the memory 322 to identify an image file stored in standard memory or stored in secured storage therein for use in performing the functions discussed herein, or to identify a digital token stored therein for providing to the processing server 102.

The computing device 104 may also include or be otherwise interfaced with one or more input devices 316. The input devices 316 may be internal to the computing device 104 or external to the computing device 104 and connected thereto via one or more connections (e.g., wired or wireless) for the transmission of data to and/or from. The input devices 316 may be configured to receive input from a user of the computing device 104, such as the consumer 108, which may be provided to another module or engine of the computing device 104 (e.g., via the communication module 304) for processing accordingly. Input devices 316 may include any type of input device suitable for receiving input for the performing of the functions discussed herein, such as a keyboard, mouse, click wheel, scroll wheel, microphone, touch screen, track pad, camera, optical imager, etc. The input device 316 may be configured to, for example, receive input selecting an image file stored in the memory 322 for submitting to the processing server 102. The input device 316 may also be configured to receive input in the performance of additional functions of the computing device 104, such as confirmation of a displayed personalized image, selection of payment credentials, navigation of web pages, etc.

The computing device 104 may also include or be otherwise interfaced with a display device 318. The display device 318 may be internal to the computing device 104 or external to the computing device 104 and connected thereto via one or more connections (e.g., wired or wireless) for the transmission of data to and/or from. The display device 318 may be configured to display data to a user of the computing device 104, such as the consumer 108. The display device 318 may be any type of display suitable for displaying data as part of the functions discussed herein, such as a liquid crystal display, light emitting diode display, thin film transistor display, capacitive touch display, cathode ray tube display, light projection display, etc. In some instances, the computing device 104 may include multiple display devices 318. The display device 318 may be configured to, for example, display web page data and application program data for use in performing the functions of the computing device 104 discussed herein, such as the display of a personalized image for confirmation by the consumer 108 and usage in the selection of payment credentials for use in funding an electronic payment transaction.

The computing device 104 may also include a transmitting device 320. The transmitting device 320 may be configured to transmit data over one or more networks via one or more network protocols. In some embodiments, the transmitting device 320 may be configured to transmit data to processing servers 102, web servers 106, and other entities via one or more networks, such as local area networks, cellular communication networks, the Internet, etc. In some embodiments, the transmitting device 320 may be comprised of multiple devices, such as different transmitting devices for transmitting data over different networks, such as a first transmitting device for transmitting data over a local area network and a second transmitting device for transmitting data over the Internet. The transmitting device 320 may electronically transmit data signals that have data superimposed that may be parsed by a receiving computing device. In some instances, the transmitting device 320 may include one or more modules for superimposing, encoding, or otherwise formatting data into data signals suitable for transmission.

The transmitting device 320 may be configured to electronically transmit data signals to processing servers 102, which may be superimposed or otherwise encoded with image files for verification, digital tokens for use in identifying personalized images, etc. The transmitting device 320 may also be configured to electronically transmit data signals to web servers 106 that are superimposed with page requests for requesting web page data for display to the consumer 108.

The computing device 104 may also include a memory 322. The memory 322 may be configured to store data for use by the computing device 104 in performing the functions discussed herein. The memory 322 may be configured to store data using suitable data formatting methods and schema and may be any suitable type of memory, such as read-only memory, random access memory, etc. The memory 322 may include, for example, encryption keys and algorithms, communication protocols and standards, data formatting standards and protocols, program code for modules and application programs of the processing device, and other data that may be suitable for use by the computing device 104 in the performance of the functions disclosed herein as will be apparent to persons having skill in the relevant art. In some embodiments, the memory 322 may be comprised of or may otherwise include a relational database that utilizes structured query language for the storage, identification, modifying, updating, accessing, etc. of structured data sets stored therein.

In some embodiments, the memory 322 may include multiple types of storage. For instance, the memory 322 may include standard storage and secured storage, where the secured storage may be specialized type of storage that utilizes additional security over traditional device storage. For example, the secured storage may be a Secure Element, trusted execution environment, or other similar type of secured storage. Standard storage of the memory 322 may be configured to store image files and, in some instances, digital tokens. Secured storage may be configured to store verified image files that have been verified by the processing server 102, and, in some cases, may store digital tokens. The memory 322 may also be configured to store program code associated with electronic wallet application programs, web browsing application programs, and other application programs that may be used in performing the functions of the computing device 104 as discussed herein. In some instances, program code may be stored in the standard storage, but may, in other instances, be stored in the secured storage for one or more application programs.

Process for Dynamic Display of a Personalized Image

Figure 4:
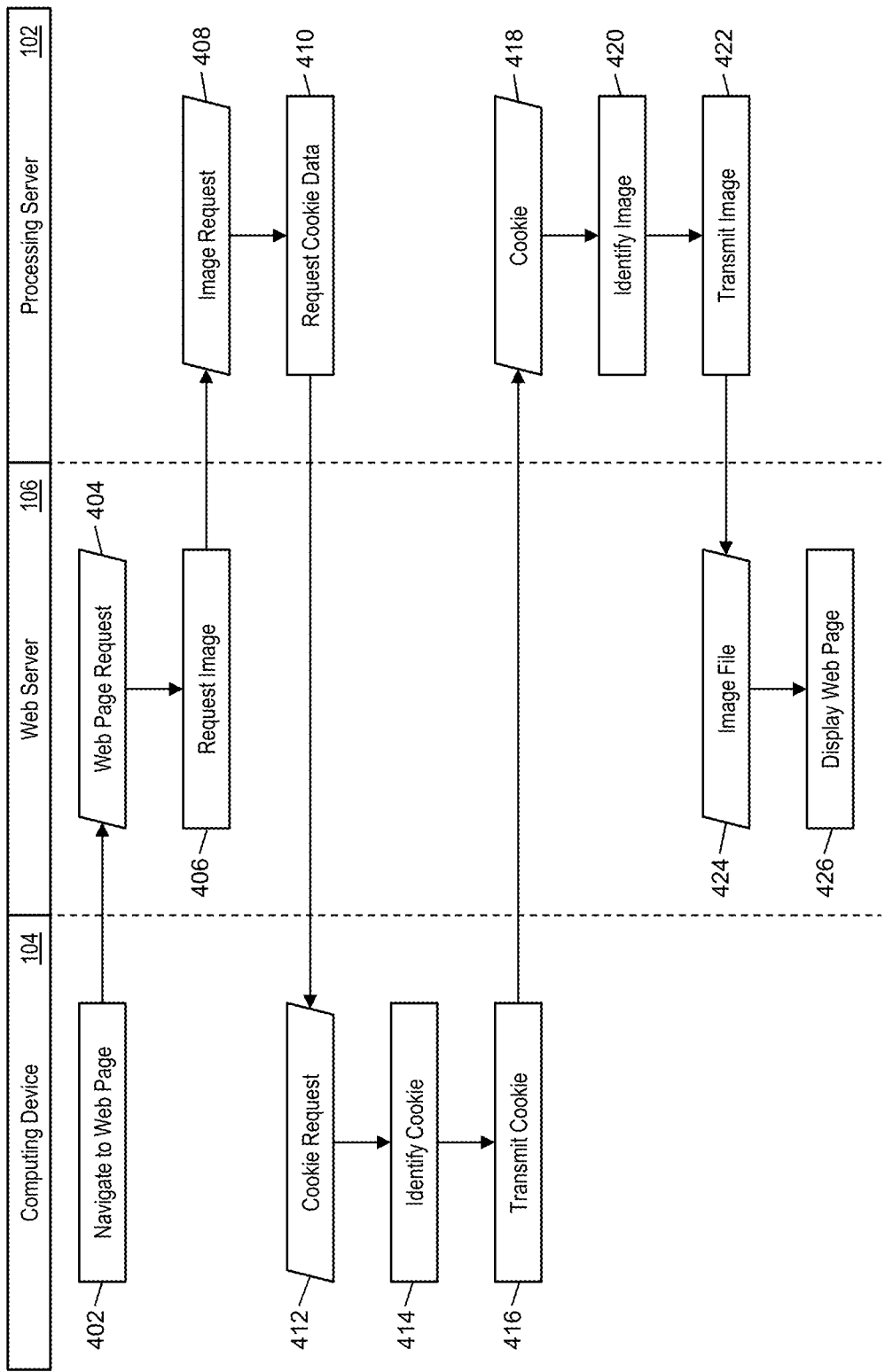
FIG. 4 is a flow diagram illustrating a process for the identification and distribution of a personalized image related to an electronic wallet using the system of FIG. 1 in accordance with exemplary embodiments.

FIG. 4 illustrates a process 400 for the dynamic display of an image personalized for an electronic wallet, to be displayed on a web page as part of the initiation of an electronic payment transaction.

In step 402, the computing device 104 may navigate to a web page for a merchant that may be used in the initiation of an electronic payment transaction involving the merchant. As part of the navigation to the web page, the transmitting device 320 of the computing device 104 may electronically transmit a data signal to a web server 106 associated therewith that is superimposed or otherwise encoded with a web page request, which may be a request for web page data based on a uniform resource locator (URL) or other value. In step 404, the web server 106 may receive the web page request. In step 406, the web server 106 may identify the web page data for the web page, which may include a static URL to load an image file for use in selection of an electronic wallet as a payment method, and may electronically transmit an image request to the processing server 102 to request the image file pointed to by the static URL.

In step 408, the receiving device 202 of the processing server 102 may receive the image request. The image request may include at least a device identifier associated with the computing device 104 for which the image is requested. In some embodiments, the device identifier may be a digital token value, or may be accompanied by a digital token value. In other embodiments, the device identifier may an originating address associated with the web server 106. In step 410, the generation module 218 of the processing server 102 may generate a cookie request, which may be electronically transmitted to the computing device 104 via the transmitting device 220 of the processing server 102. The cookie request may include identifying information suitable for use in identifying a cookie or other data file. In embodiments where the image request only includes a originating address, the cookie request may be electronically transmitted to the web server 106, which may forward the cookie request to the computing device 104.

In step 412, the receiving device 302 of the computing device 104 may receive the cookie request. In step 414, the querying module 214 of the computing device 104 may execute a query on the memory 322 of the computing device 104 to identify a cookie stored therein that corresponds to the cookie requested in the cookie request, such as may be identified via the identification information included therein. For example, the cookie may be associated with a name that is included in the received cookie request. In step 416, the transmitting device 320 of the computing device 104 may electronically transmit the requested cookie to the processing server 102. In embodiments where the web server 106 was used in forwarding of the cookie request, the computing device 104 may transmit the requested cookie to the web server 106 for forwarding to the processing server 102. In some embodiments, the cookie may be transmitted to the processing server 102 as part of the image request submitted in step 406 (and provided to the web server 106 by the computing device 104, in step 402). In such embodiments, steps 410-416 may be optional.

In step 418, the receiving device 202 of the processing server 102 may receive the cookie. The cookie may include at least one or more data values. In some embodiments, the cookie may also, or alternatively, include a token value. In step 420, the processing server 102 may identify an image file. The image file may be identified based on at least the one or more data values included in the cookie, such as via the execution of a query on the image database 206 by the querying module 214 of the processing server 102 to identify an image profile 208 where the included data values correspond to those included in the cookie, where the identified image file is included in or otherwise indicated by the image profile 208. In some instances, the identification of the image file may also include the identification of the one or more data values for use in the query executed on the image database 208 by the execution of a query on the account database 210 of the processing server 102 by the querying module 214 to identify an account profile 212 that includes a token value that corresponds to a token value included in the received cookie, if applicable.

Once the image file is identified, then, in step 422, the transmitting device 220 of the processing server 102 may electronically transmit a data signal to the web server 106 that is superimposed or otherwise encoded with the identified image file. In step 424, the web server 106 may receive the image file. In step 426, the web server 106 may electronically transmit the web page data, including the image file, to the computing device 104. In step 428, the receiving device 302 of the computing device 104 may receive and may display, via a display device 318 interfaced with the computing device 104, the web page data to the consumer 108 as a user of the computing device 104. The consumer 108 may then see the image file as a personalized image that is personalized based on their electronic wallet and, if applicable, preferred payment products.

Process for Identification and Distribution of a Personalized Image

Figure 5:
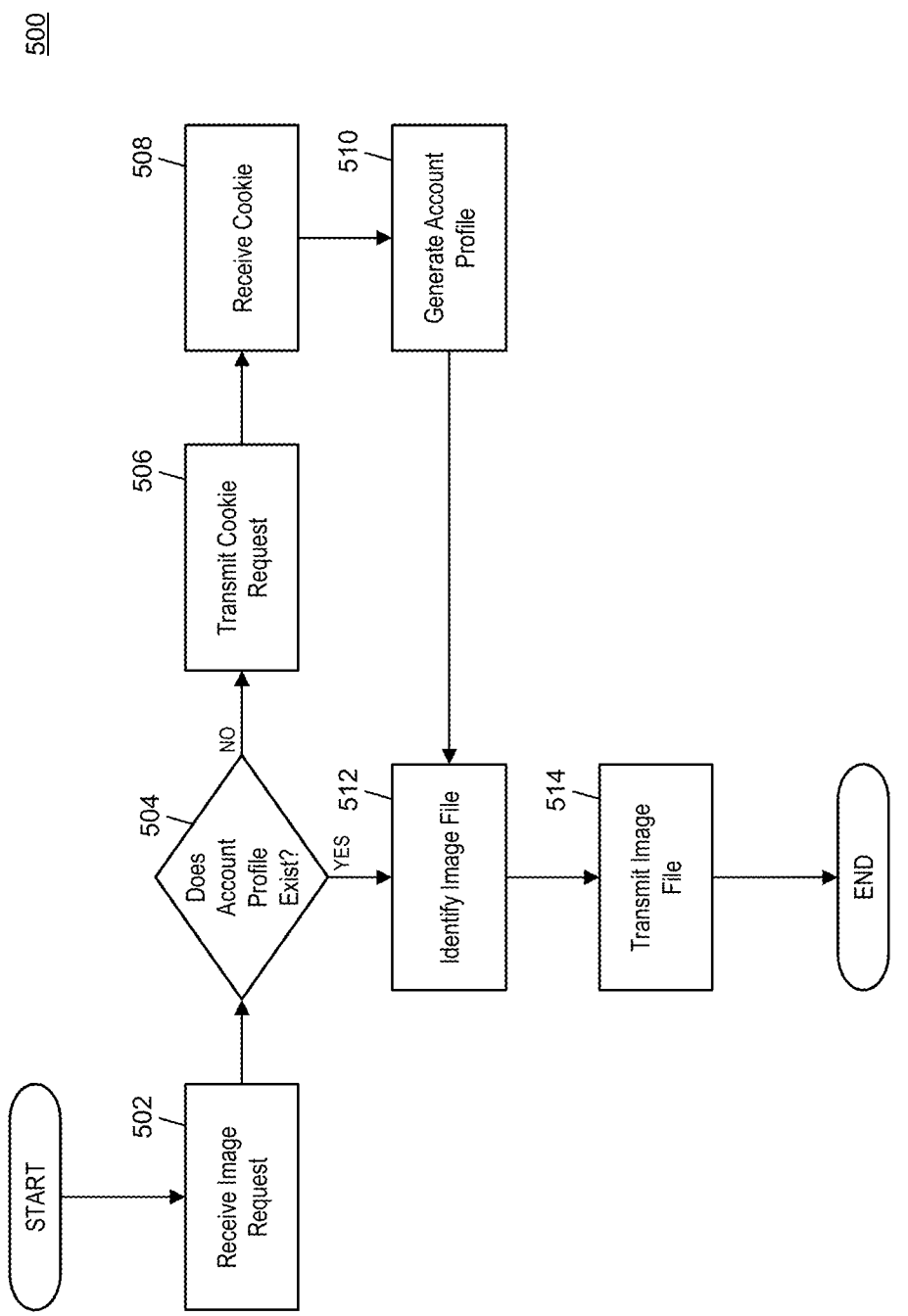
FIG. 5 is a flow diagram illustrating a process for the dynamic display of a personalized image using the processing server of FIG. 2 in accordance with exemplary embodiments.

FIG. 5 illustrates a process 500 as executed by the processing server 102 of the system 100 for the identification and distribution of a personalized image that is identified for an electronic wallet for dynamic display on a web page.

In step 502, the receiving device 202 of the processing server 102 may receive an image request from a web server 106. The image request may include at least an originating address associated with the web server 106, and may also include a digital token value or other device identifier associated with a computing device 104 that has navigated to a web page for which the image request is made or an electronic wallet or consumer 108 associated therewith. In step 504, the determination module 216 of the processing server 102 may determine if an account profile 212 already exists for the received token value. The determination may be based on a result of a query executed on the account database 210 of the processing server 102 by the querying module 214 thereof.

If an account profile 212 does not exist, if the query does not yield any account profile 212 that includes the token value, then, in step 506, the transmitting device 220 of the processing server 102 may electronically transmit a data signal superimposed or otherwise encoded with a cookie request to the computing device 104. In some instances, the data signal may be electronically transmitted to the web server 106 via the originating address included in the received image request, for forwarding to the computing device 104. The cookie request may include at least a name or other identification value for use in identifying a cookie associated therewith. In step 508, the receiving device 202 of the processing server 102 may receive a cookie from the computing device 104, which may be forwarded via the web server 106, as applicable. The cookie may include at least one or more data values for use in the identification of a personalized image file. In step 510, the querying module 214 of the processing server 102 may execute a query on the account database 210 to insert a new account profile 212 into the account database 210 that includes the token value parsed from the image request and the one or more data values parsed from the received cookie.

Once the account profile 212 has been created, or, if an account profile 212 was already in existence for the token value as determined in step 504, then, in step 512, a personalized image file may be identified. Identification of the personalized image file may include the execution of a query on the image database 206 of the processing server 102 by the querying module 214 to identify an image profile 208 where the included one or more data values corresponds to the one or more data values included in the account profile 212 that was identified or created. The personalized image file may be the image file included in the identified image profile 208 or indicated thereby via a resource locator or other reference included in the identified image profile 208. In step 514, the transmitting device 220 of the processing server 102 may electronically transmit the identified image file to the web server 106 for display on the web page.

Process for Secured Storage and Usage of a Personalized Image

Figure 6:
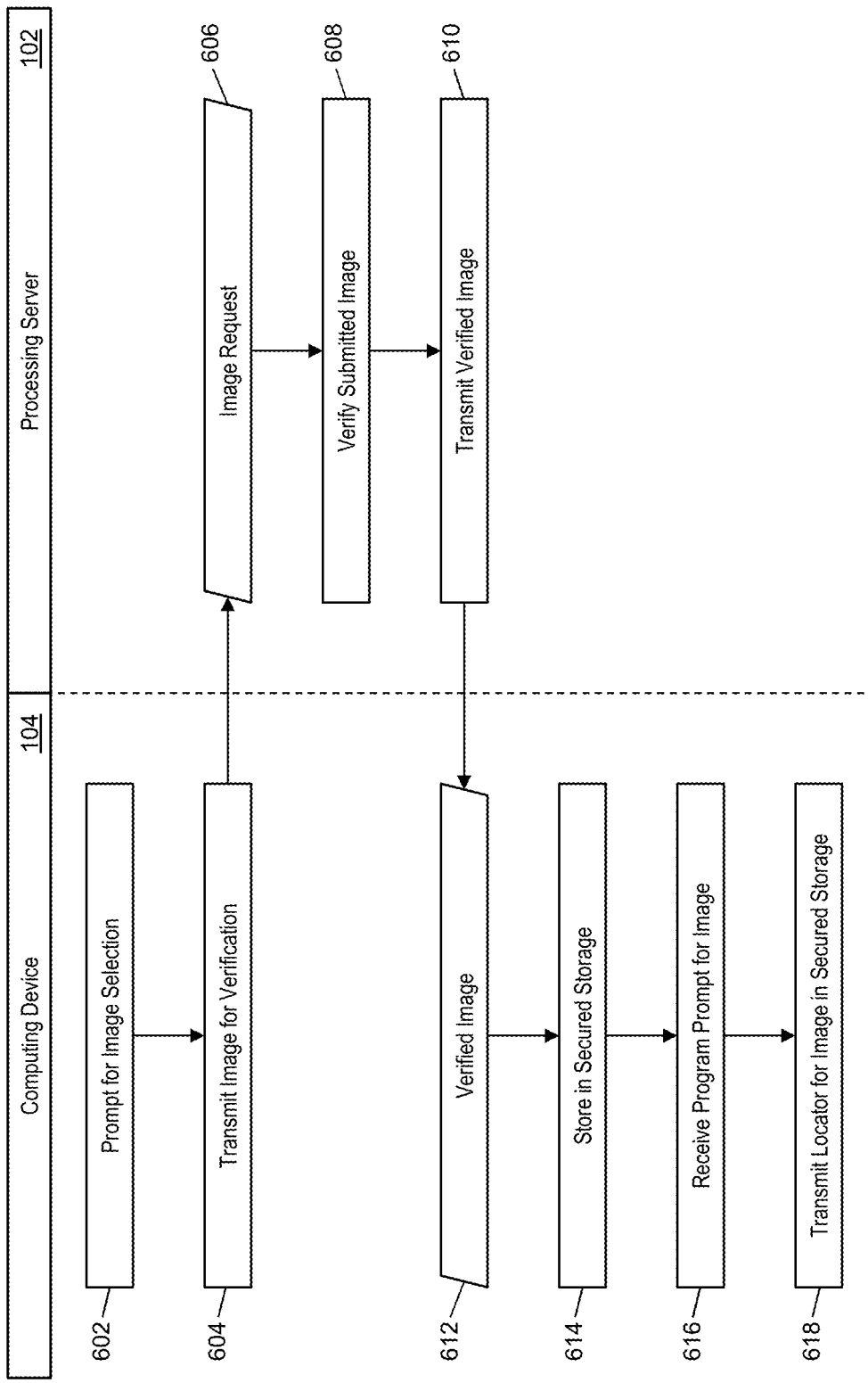
FIG. 6 is a flow diagram illustrating a process for the secured storage of a verified personalized image in a computing device using the system of FIG. 1 in accordance with exemplary embodiments.

FIG. 6 illustrates a process for the secured storage of a personalized image in the computing device 104 and usage thereof in the system 100.

In step 602, the display device 318 interfaced with the computing device 104 may display a prompt to the consumer 108 as a user of the computing device 104 to select an image stored in the memory 322 (e.g., in the standard storage or secured storage). The user's selection of the image file to be used may be received via an input device 316 interfaced with the computing device 104. In step 604, the transmitting device 320 of the computing device 104 may electronically transmit the image file for the selected image to the processing server 102 for verification.

In step 606, the receiving device 202 of the processing server 102 may receive the image file. In step 608, the determination module 216 of the processing server 102 may determine if the image file complies with one or more image qualification rules (e.g., stored in the memory 222 thereof and identified via a query executed by the querying module 214 of the processing server 102). As part of the verification of the image file, the generation module 218 of the processing server 102 may modify the image file to indicate the verification, such as by adding or modifying encoded data or modifying the actual image, such as for compliance with image qualification rules regarding what is depicted in the image file. In step 610, the transmitting device 220 of the processing server 102 may electronically transmit the verified image file to the computing device 104.

In step 612, the receiving device 302 of the computing device 104 may receive the verified image file. In step 614, the querying module 314 of the computing device 104 may execute a query on the memory 322 thereof to store the verified image file in a secured storage of the memory 322. In step 616, a request for the verified image file may be received by the computing device 104. In one embodiment, the request may be an external request received by the receiving device 302, such as from the web server 106 as part of a web page request In another embodiment, the request may be an internal request of the computing device 104, such as submitted from one application program (e.g., a web browsing application program) to another application program (e.g., an electronic wallet application program) executed by the computing device 104. In step 618, the transmitting device 320 of the computing device 104 may electronically transmit a uniform resource locator (URL) to the requesting system or program, where the URL refers to the location of the verified image file in secured storage. In some instances, the verified image file itself may be transmitted in place of the URL.

Exemplary Method for Identification and Distribution of a Personalized Image

Figure 7:
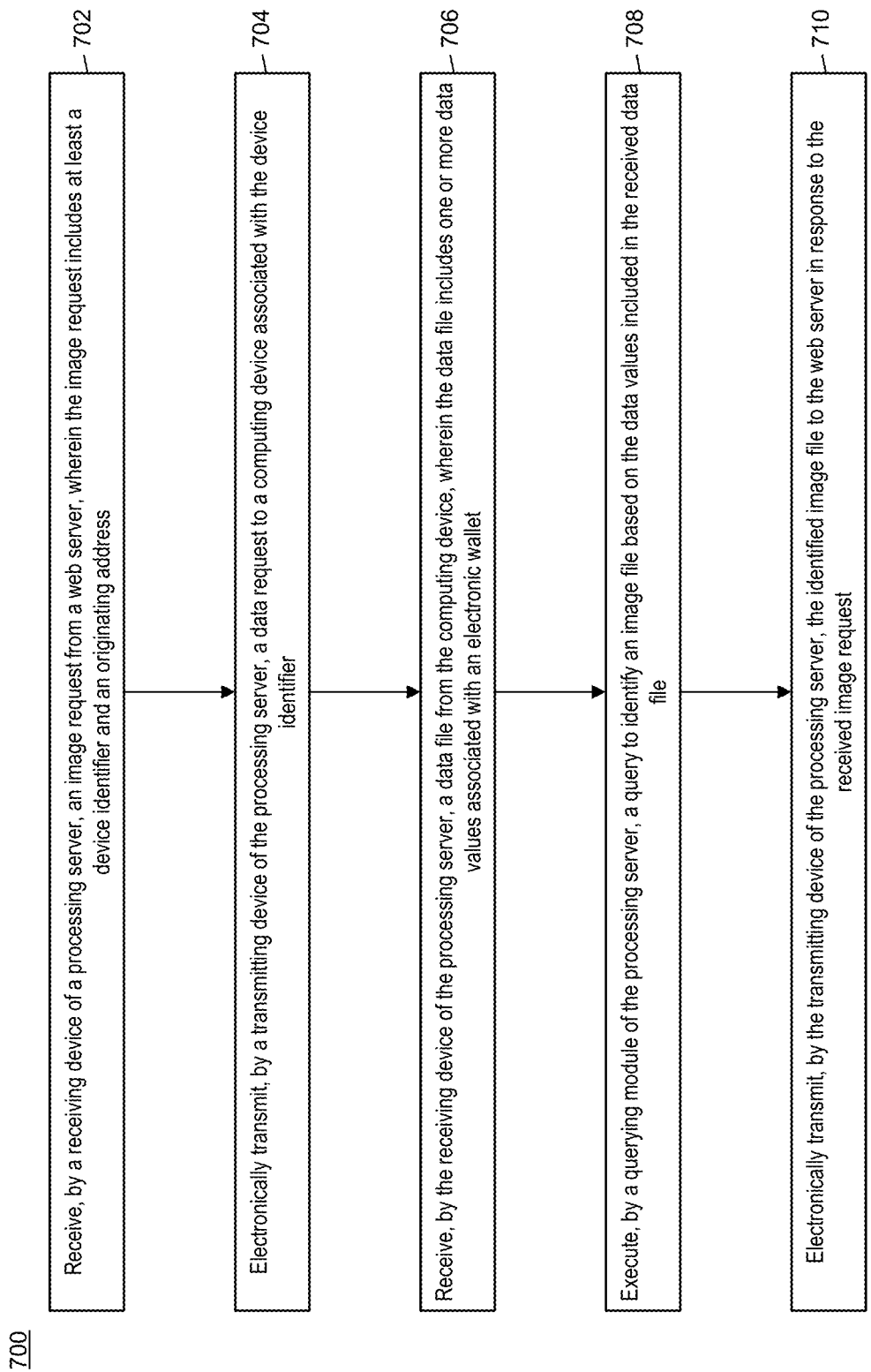
FIG. 7 is a flow chart illustrating an exemplary method for identification and distribution of a personalized image in accordance with exemplary embodiments.

FIG. 7 illustrates a method 700 for the identification and distribution of a personalized image that is dynamically displayed and personalized based on an electronic wallet.

In step 702, an image request may be received by a receiving device (e.g., the receiving device 202) of a processing server (e.g., the processing server 102) from a web server (e.g., the web server 102), wherein the image request includes at least a device identifier and an originating address. In step 704, a data request may be electronically transmitted by a transmitting device (e.g., the transmitting device 220) of the processing server to a computing device (e.g., the computing device 104) associated with the device identifier.

In step 706, a data file may be received from the computing device by the receiving device of the processing server, wherein the data file includes one or more data values associated with an electronic wallet. In step 708, a query may be executed by a querying module (e.g., the querying module 214) of the processing server to identify an image file based on the data values included in the received data file. In step 710, the identified image file may be electronically transmitted to the web server by the transmitting device of the processing server in response to the received image request.

In one embodiment, the data file may be included in the received image request. In some embodiments, the method 700 may further include storing, in an image database (e.g., the image database 206) of the processing server, a plurality of image profiles (e.g., image profiles 208), wherein each image profile includes at least an image file or reference locator and one or more corresponding values, wherein the query is executed on the image database to identify a specific image profile based on a correspondence between the one or more data values and the one or more corresponding values, and the identified image file is the image file included in the identified specific image profile or identified via the reference locator included in the identified specific image profile.

In one embodiment, the data file may further include a token value. In a further embodiment, the method 700 may also include storing, in an account database (e.g., the account database 210) of the processing server, an account profile (e.g., account profile 212), wherein the account profile is a structured data set related to the computing device including at least the token value and one or more data values. In some embodiments, the one or more data values may include at least a wallet identifier and a brand identifier. In one embodiment, the one or more data values may include at least one of: a wallet identifier, a brand identifier, a product identifier, an account identifier, and a product name.

In some embodiments, the image request may further include a merchant identifier, and the identified image file may be further identified based on the merchant identifier. In one embodiment, the device identifier may be one of: a media access control address and an internet protocol address. In some embodiments, the identified image file may be electronically transmitted to the web server using the originating address.

Exemplary Method for Distribution of a Personalized Image

Figure 8:
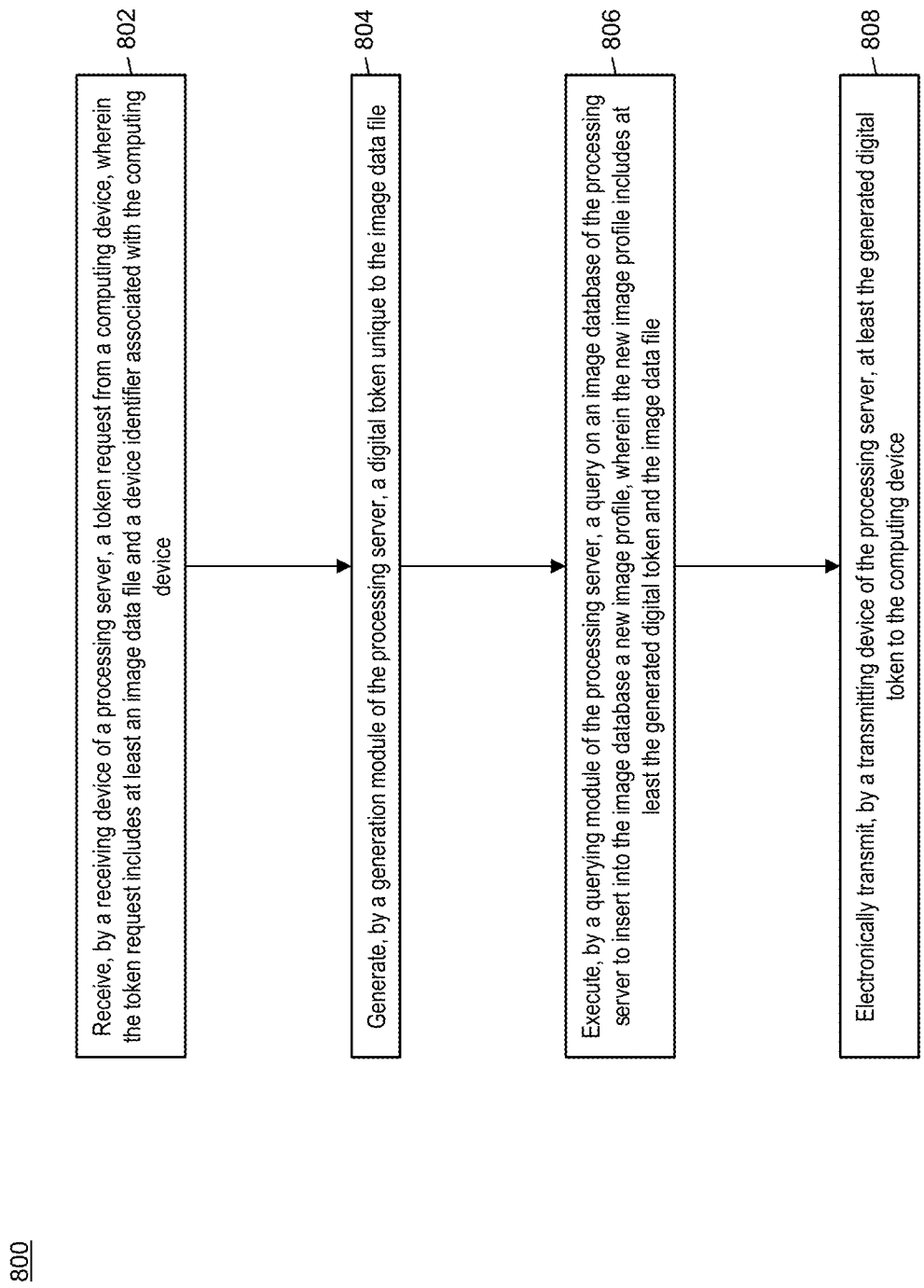
FIG. 8 is a flow chart illustrating an exemplary method for distribution of a personalized image in accordance with exemplary embodiments.

FIG. 8 illustrates a method 800 for the distribution of a personalized image to a computing device via the use of a digital token generated for and associated with the personalized image.

In step 802, a token request may be received by a receiving device (e.g., the receiving device 202) of a processing server (e.g., the processing server 102) from a computing device (e.g., the computing device 104), wherein the token request includes at least an image data file and a device identifier associated with the computing device. In step 804, a digital token unique to the image data file may be generated by a generation module (e.g., the generation module 218) of the processing server.

In step 806, a query may be executed on an image database (e.g., the image database 206) of the processing server by a querying module (e.g., the querying module 214) to insert into the image database a new image profile (e.g., image profile 208), wherein the new image profile includes at least the generated digital token and the image data file. In step 808, at least the generated digital token may be electronically transmitted to the computing device by a transmitting device (e.g., the transmitting device 220) of the processing server.

In one embodiment, the method 800 may further include: receiving, by the receiving device of the processing server, an image request, wherein the image request includes at least the generated digital token; executing, by the querying module of the processing server, a query on the image database to identify the image data file stored in the new image profile including the generated digital token; and electronically transmitting, by the transmitting device of the processing server, the image data file in response to the received image request. In some embodiments, the method 800 may also include: storing, in a memory (e.g., the memory 222) of the processing server, one or more image qualification rules; and determining, by a determination module (e.g., the determination module 216) of the processing server, compliance of the image data file with each of the one or more image qualification rules prior to transmission of the generated digital token to the computing device.

Exemplary Method for Storage of a Personalized Image

Figure 9:
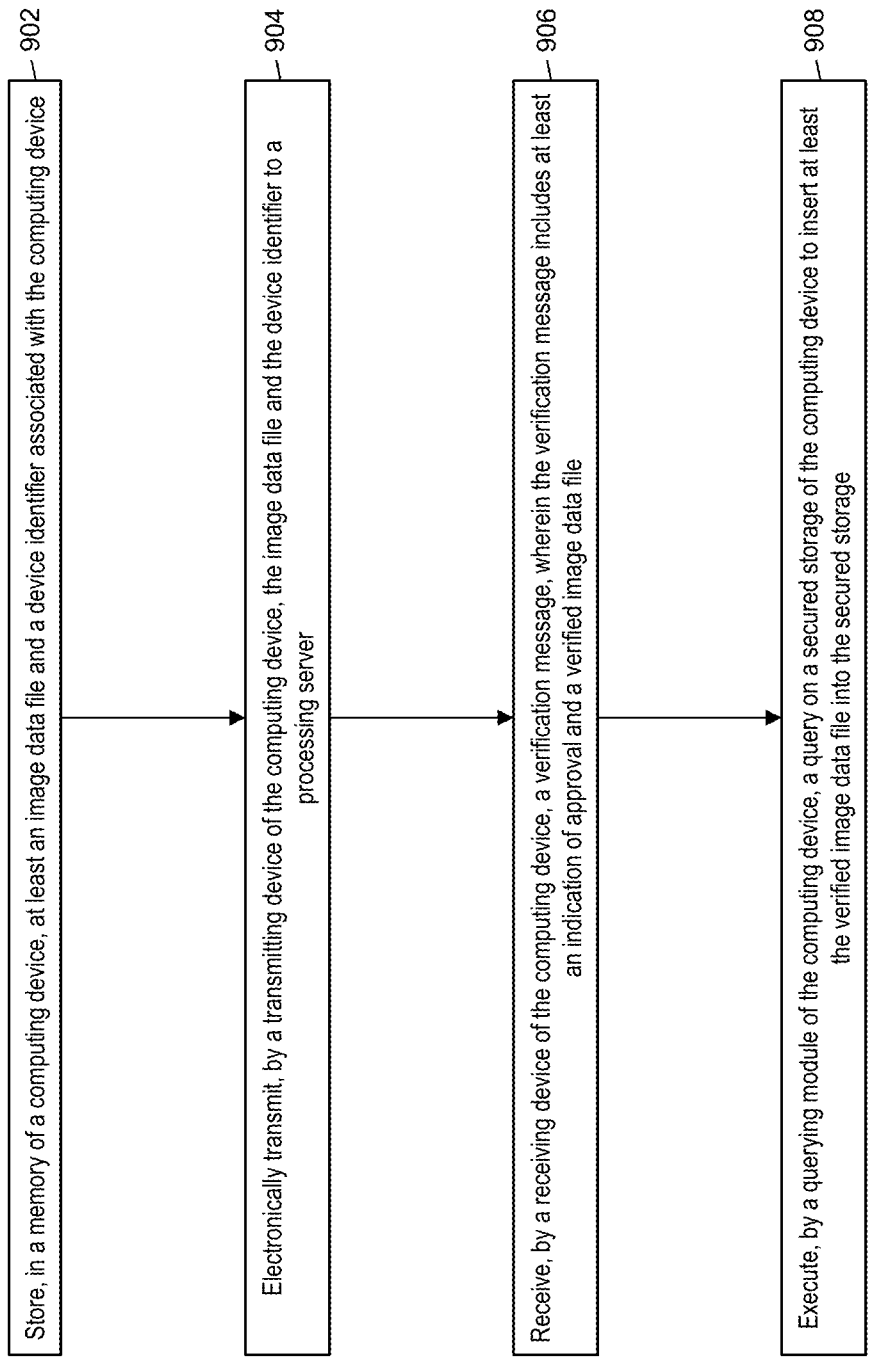
FIG. 9 is a flow chart illustrating an exemplary method for storage of a personalized image in accordance with exemplary embodiments.

FIG. 9 illustrates a method 900 for the storage of an externally verified personalized image in secure storage of a computing device.

In step 902, at least an image data file and a device identifier associated with a computing device (e.g., the computing device 104) may be stored in a memory (e.g., the memory 322) of the computing device. In step 904, the image data file and the device identifier may be electronically transmitted by a transmitting device (e.g., the transmitting device 320) of the computing device to a processing server (e.g., the processing server 102).

In step 906, a verification message may be received by a receiving device (e.g., the receiving device 302) of the computing device, wherein the verification message includes at least an indication of approval and a verified image data file. In step 908, a query may be executed on a secured storage of the computing device by a querying module (e.g., the querying module 314) of the computing device to insert at least the verified image file into the secured storage.

In one embodiment, the verified image data file may be a modified version of the transmitted image data file including one or more modifications based on one or more image qualification rules. In some embodiments, the method 900 may further include receiving, by an input device (e.g., the input device 316) interfaced with the computing device, input requesting submission of the image data file prior to transmission of the image data file. In one embodiment, the method 900 may also include: receiving, at a second application program executed by the computing device, an image request submitted by a first application program executed by the computing device; and electronically transmitting, by the second application program, the verified image data file stored in the secured storage to the first application program. In some embodiments, the method 900 may further include: receiving, at a second application program executed by the computing device, an image request submitted by a first application program executed by the computing device; and electronically transmitting, by the second application program, a uniform resource locator to the first application program, wherein the uniform resource locator locates the verified image data file stored in the secured storage.

Computer System Architecture

Figure 10:
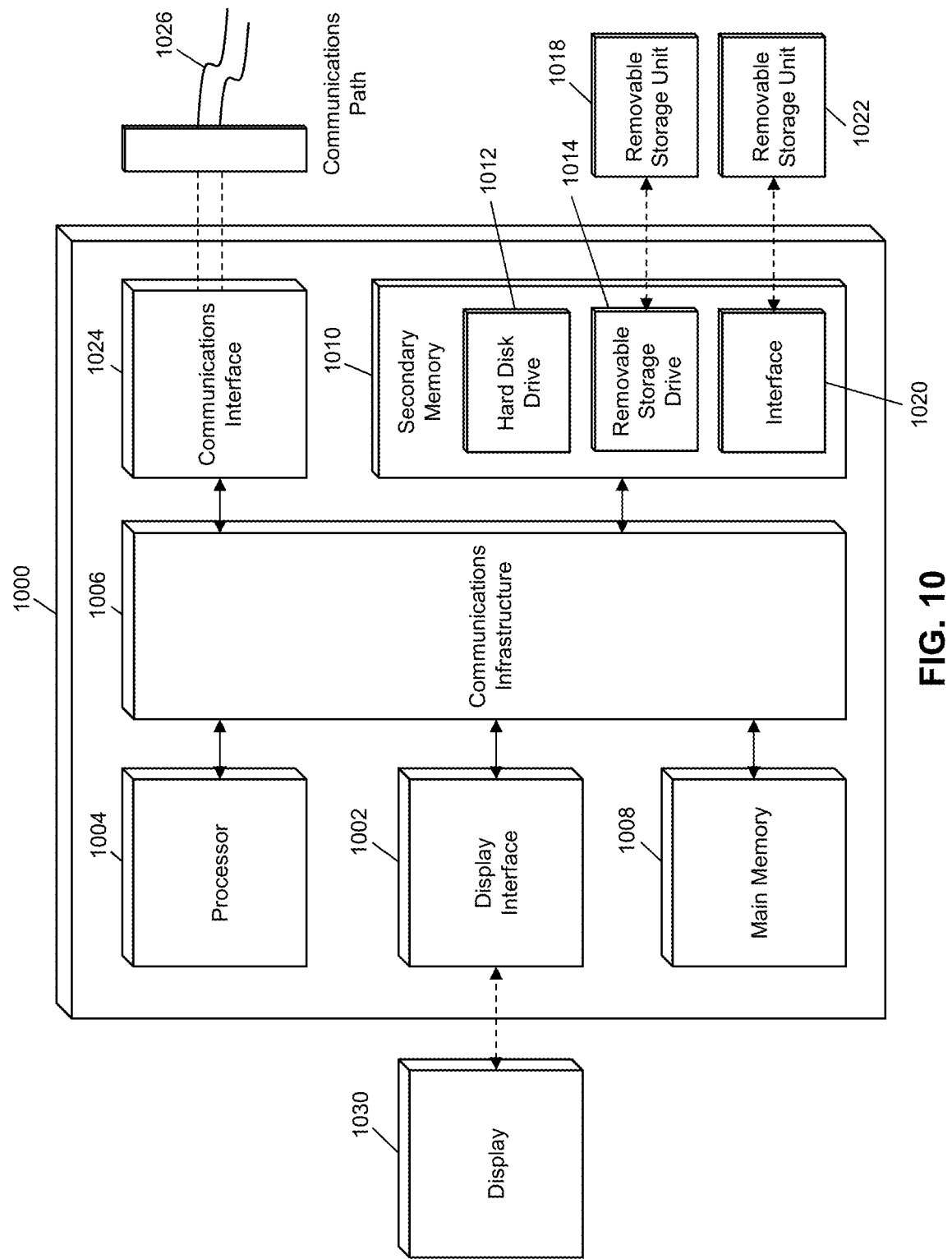
FIG. 10 is a block diagram illustrating a computer system architecture in accordance with exemplary embodiments.

FIG. 10 illustrates a computer system 1000 in which embodiments of the present disclosure, or portions thereof, may be implemented as computer-readable code. For example, the processing server 102 and computing device 104 of FIG. 1 may be implemented in the computer system 1000 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3-9.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 1018, a removable storage unit 1022, and a hard disk installed in hard disk drive 1012.

Various embodiments of the present disclosure are described in terms of this example computer system 1000. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 1004 may be a special purpose or a general purpose processor device specifically configured to perform the functions discussed herein. The processor device 1004 may be connected to a communications infrastructure 1006, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 1000 may also include a main memory 1008 (e.g., random access memory, read-only memory, etc.), and may also include a secondary memory 1010. The secondary memory 1010 may include the hard disk drive 1012 and a removable storage drive 1014, such as a floppy disk drive, a magnetic tape drive, an optical disk drive, a flash memory, etc.

The removable storage drive 1014 may read from and/or write to the removable storage unit 1018 in a well-known manner. The removable storage unit 1018 may include a removable storage media that may be read by and written to by the removable storage drive 1014. For example, if the removable storage drive 1014 is a floppy disk drive or universal serial bus port, the removable storage unit 1018 may be a floppy disk or portable flash drive, respectively. In one embodiment, the removable storage unit 1018 may be non-transitory computer readable recording media.

In some embodiments, the secondary memory 1010 may include alternative means for allowing computer programs or other instructions to be loaded into the computer system 1000, for example, the removable storage unit 1022 and an interface 1020. Examples of such means may include a program cartridge and cartridge interface (e.g., as found in video game systems), a removable memory chip (e.g., EEPROM, PROM, etc.) and associated socket, and other removable storage units 1022 and interfaces 1020 as will be apparent to persons having skill in the relevant art.

Data stored in the computer system 1000 (e.g., in the main memory 1008 and/or the secondary memory 1010) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 1000 may also include a communications interface 1024. The communications interface 1024 may be configured to allow software and data to be transferred between the computer system 1000 and external devices. Exemplary communications interfaces 1024 may include a modem, a network interface (e.g., an Ethernet card), a communications port, a PCMCIA slot and card, etc. Software and data transferred via the communications interface 1024 may be in the form of signals, which may be electronic, electromagnetic, optical, or other signals as will be apparent to persons having skill in the relevant art. The signals may travel via a communications path 1026, which may be configured to carry the signals and may be implemented using wire, cable, fiber optics, a phone line, a cellular phone link, a radio frequency link, etc.

The computer system 1000 may further include a display interface 1002. The display interface 1002 may be configured to allow data to be transferred between the computer system 1000 and external display 1030. Exemplary display interfaces 1002 may include high-definition multimedia interface (HDMI), digital visual interface (DVI), video graphics array (VGA), etc. The display 1030 may be any suitable type of display for displaying data transmitted via the display interface 1002 of the computer system 1000, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 1008 and secondary memory 1010, which may be memory semiconductors (e.g., DRAMs, etc.). These computer program products may be means for providing software to the computer system 1000. Computer programs (e.g., computer control logic) may be stored in the main memory 1008 and/or the secondary memory 1010. Computer programs may also be received via the communications interface 1024. Such computer programs, when executed, may enable computer system 1000 to implement the present methods as discussed herein. In particular, the computer programs, when executed, may enable processor device 1004 to implement the methods illustrated by FIGS. 3-9, as discussed herein. Accordingly, such computer programs may represent controllers of the computer system 1000. Where the present disclosure is implemented using software, the software may be stored in a computer program product and loaded into the computer system 1000 using the removable storage drive 1014, interface 1020, and hard disk drive 1012, or communications interface 1024.

The processor device 1004 may comprise one or more modules or engines configured to perform the functions of the computer system 1000. Each of the modules or engines may be implemented using hardware and, in some instances, may also utilize software, such as corresponding to program code and/or programs stored in the main memory 1008 or secondary memory 1010. In such instances, program code may be compiled by the processor device 1004 (e.g., by a compiling module or engine) prior to execution by the hardware of the computer system 1000. For example, the program code may be source code written in a programming language that is translated into a lower level language, such as assembly language or machine code, for execution by the processor device 1004 and/or any additional hardware components of the computer system 1000. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 1000 to perform the functions disclosed herein. It will be apparent to persons having skill in the relevant art that such processes result in the computer system 1000 being a specially configured computer system 1000 uniquely programmed to perform the functions discussed above.

Techniques consistent with the present disclosure provide, among other features, systems and methods for identification, distribution, and storage of personalized images. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for identification and distribution of a personalized image, comprising:
    receiving, by a receiving device of a processing server, an image file from a computing device a user;
    verifying, by a processor of the processing server, that the received image file complies with one or more authorization rules;
    electronically transmitting, by a transmitting device of the processing server, the verified image file to the computing device;
    receiving, by the receiving device of a processing server, a request from a web server conducting an online electronic payment transaction with the computing device, wherein the request consists of an originating address of the web server;
    electronically transmitting, by the transmitting device of the processing server, a data request to the web server, the data request being transmitted to the computing device via the web server;
    receiving, by the receiving device of the processing server, a data file from the computing device based on the data request, wherein the data file includes one or more data values associated with an electronic wallet to be presented as a payment option for the online electronic payment transaction;
    executing, by a querying module of the processing server, a query to identify the verified image file associated with the electronic wallet based on the one or more data values included in the received data file; and
    electronically transmitting, by the transmitting device of the processing server, the verified image file identified by the querying module as the payment option for selection of the electronic wallet to the web server in response to the received request.

2. The method of claim 1, wherein the data file is included in the received request.

3. The method of claim 1, further comprising:
    storing, in an image database of the processing server, a plurality of image profiles, wherein each image profile includes at least an image file or reference locator and one or more corresponding values, wherein
    the query is executed on the image database to identify a specific image profile based on a correspondence between one data value and one corresponding value or between a plurality of data values and a plurality of corresponding values, and
    the verified image file included in the identified specific image profile or identified via the reference locator included in the identified specific image profile.

4. The method of claim 1, wherein the data file further includes a token value.

5. The method of claim 4, further comprising:
    storing, in an account database of the processing server, an account profile, wherein the account profile is a structured data set related to the computing device including at least the token value and one or more data values.

6. The method of claim 1, wherein the one or more data values includes at least a wallet identifier and a brand identifier.

7. The method of claim 1, wherein the one or more data values includes at least one of: a wallet identifier, a brand identifier, a product identifier, an account identifier, and a product name.

8. The method of claim 1, wherein the identified image file is electronically transmitted to the web server using the originating address.

9. The method of claim 1, wherein verifying the image file comprises:
    editing, by the processor of the processing server, the received image file for compliance with the one or more authorization rules.

10. A system for identification and distribution of a personalized image, comprising:
    a querying module of a processing server;
    a receiving device of the processing server configured to receive an image file from a computing device a user and receive a request from a web server conducting an online electronic payment transaction with a computing device, wherein the request consists of an originating address of the web server;
    a processor of the processing server configured to verify that the received image file complies with one or more authorization rules; and
    a transmitting device of the processing server configured to electronically transmit the verified image file to the computing device and a data request to the web server, the data request being transmitted to the computing device via the web server, wherein:
    the receiving device of the processing server is further configured to receive a data file from the computing device based on the data request, wherein the data file includes one or more data values associated with an electronic wallet to be presented as a payment option for the online electronic payment transaction,
    the querying module of the processing server is configured to execute a query to identify the verified image file associated with the electronic wallet based on the one or more data values included in the received data file, and
    the transmitting device of the processing server is further configured to electronically transmit the verified image file identified by the querying module as the payment option for selection of the electronic wallet to the web server in response to the received request.

11. The system of claim 10, wherein the data file is included in the received request.

12. The system of claim 10, further comprising:
    an image database of the processing server configured to store a plurality of image profiles, wherein each image profile includes at least an image file or reference locator and one or more corresponding values, wherein
    the query is executed on the image database to identify a specific image profile based on a correspondence between one data value and one corresponding value or between a plurality of data values and a plurality of corresponding values, and
    the verified image file included in the identified specific image profile or identified via the reference locator included in the identified specific image profile.

13. The system of claim 10, wherein the data file further includes a token value.

14. The system of claim 13, further comprising:
    an account database of the processing server configured to store an account profile, wherein the account profile is a structured data set related to the computing device including at least the token value and one or more data values.

15. The system of claim 10, wherein the one or more data values includes at least a wallet identifier and a brand identifier.

16. The system of claim 10, wherein the one or more data values includes at least one of: a wallet identifier, a brand identifier, a product identifier, an account identifier, and a product name.

17. The system of claim 10, wherein the identified image file is electronically transmitted to the web server using the originating address.

18. The system of claim 10, wherein the processor is further configured to edit the received image file for compliance with the one or more authorization rules.

\* \* \* \* \*